Figures 1, 2:
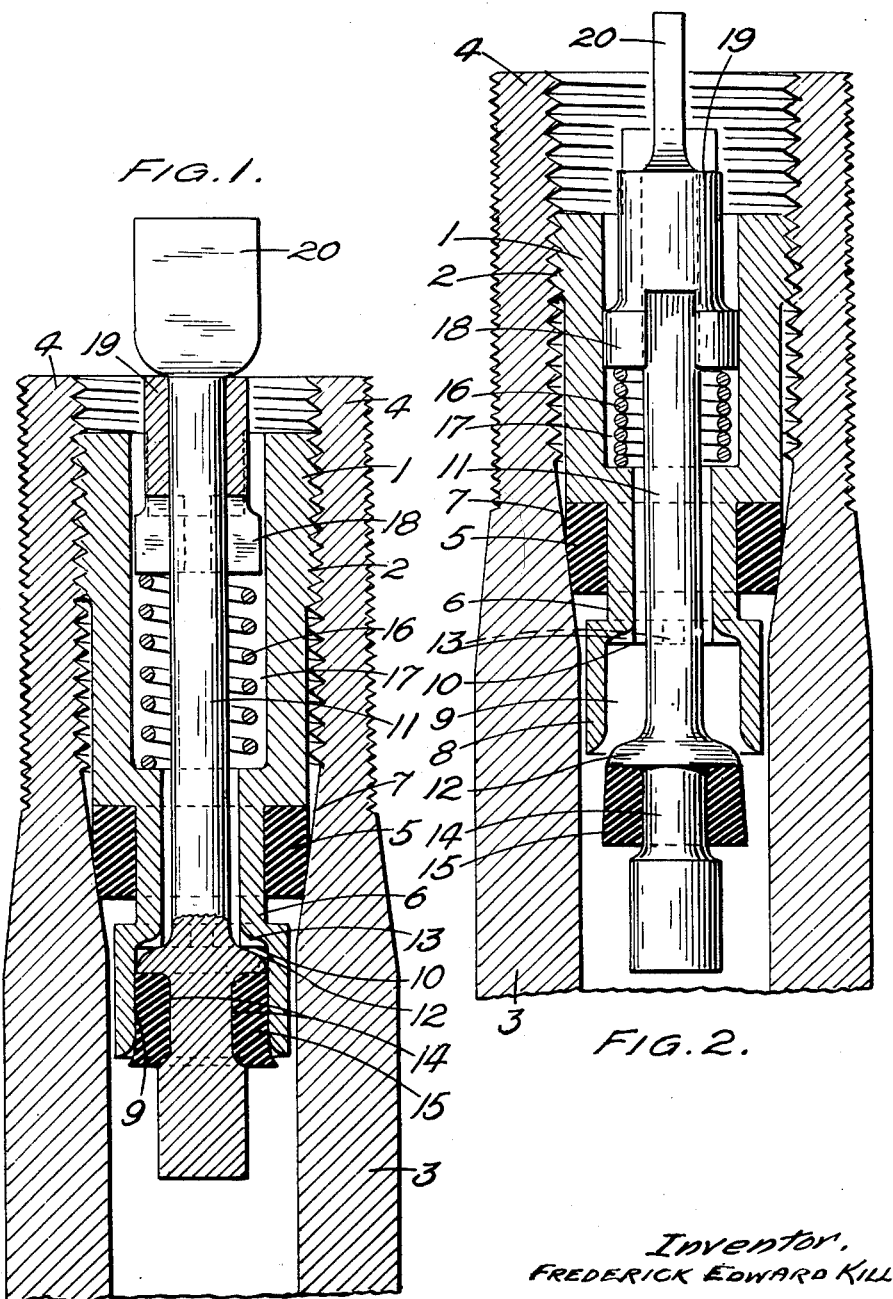

June 21, 1949.  F. E. KILLNER  2,473,591
VALVE
Filed Nov. 16, 1943

Inventor,
FREDERICK EDWARD KILLNER
By Reynolds & Beach
Attys.

Patented June 21, 1949

2,473,591

UNITED STATES PATENT OFFICE 2,473,591

VALVE

Frederick Edward Killner, Cheltenham, England, assignor to Dowty Equipment Limited, Cheltenham, England Application November 16, 1943, Serial No. 510,502
In Great Britain November 17, 1942

3 Claims. (Cl. 251—144)

This invention relates to valve insides for inflation valves, and in order to make clear at the outset exactly what is meant by a valve insides it can be stated that the invention is concerned with the type of device which comprises the sealing element or mechanical part of the valve, the valve insides constituting a self-contained non-return valve element for engagement in a tubular valve stem of a pneumatic tyre inner tube, or in the inflation valve orifice, stem or connection of an inflation chamber, as in an oleo-pneumatic shock absorber. Such valve insides essentially comprise a valve body which is generally threaded externally for screwing into the internally threaded valve stem in which it is to be engaged, and when the valve insides is in position in the valve stem, or other inflation connection, a static seal engaged with the valve stem confines fluid flow through the valve to passage through a bore through the valve body. A valve spindle extends through the bore and mounts a resiliently deformable valve element for sealing engagement with a valve seat portion of the valve body.

The valve being subject to internal pressure prevailing in the pneumatic tyre inner tube or other inflation chamber, and sometimes also to mechanical spring-loading as well, is firmly engaged against the seat to prevent pressure leakage through the bore of the valve body from the interior of the inner tube or other inflation chamber. The outer end of the valve spindle usually terminates in the region of the mouth of the valve stem or other inflation connection, where it may in some cases be engaged by a projection in the air chuck employed for inflation, but whether or not the valve is mechanically opened by such projection, opening will eventually occur when a build-up of pressure in the air chuck blowing into the bore of the valve body exerts enough force to unseat the resiliently deformable valve element.

The present invention consists in a valve insides in which the inner end of the valve body terminates in a cup shape formation, defining a substantially rigid valve seat into which a generally cylindrical, resiliently deformable valve element engages for sealing by lateral engagement with the valve seat.

It is to be understood that reference to the valve seat being "substantially rigid" is not necessarily intended to imply absolute mechanical rigidity, but rather to make it clear that the valve seat is not likely to be deformed by the resiliently deformable valve element under any normal operating pressures.

The fact that the valve seat is recessed is a matter of extreme importance from the point of view of the present invention for several reasons.

First, a large valve area is available for sealing, from which it follows that the inclusion of a small particle of dust trapped between the resiliently deformable valve element and the seat is less likely to cause leakage than where a flat faced valve is employed.

Second, if the walls of the recess define a cavity which is cylindrical or nearly so, the valve will open for inflation at quite a small external pressure gradient over internal pressure loading the valve shut. This circumstance is obtained because of a substantial balance of valve areas presented respectively to the internal and external pressures. Light opening of the valve is a feature of considerable importance in cases where the valve is employed to seal against high pressures, of the order of hundreds of pounds per square inch, and where an accurate pressure reading is required at all times in the inflation line.

Third, if the nose of the resiliently deformable valve element is tapered and the mouth of the valve seat flared, or if in any equivalent manner these cooperating elements are relatively formed to facilitate entry into the recessed valve seat, the valve is self-centering, and the sealing effect is not likely to be impaired by the valve tending to get slightly out of centre. A tapered form of resiliently deformable valve element also presents the advantage that it will not so readily deform in any permanent sense by contact with a sharp valve seat, as is apt to be the case where a flat faced valve is employed, and even if the tapered form of resiliently deformable valve element does become indented, the only result will be that the valve will enter the recessed valve seat to a slightly greater extent when next it seats.

Fourth, the formation of the resiliently deformable valve element as an annulus of appropriate external shape is easier to produce, and the manufacturing tolerances are less critical; moreover, the resiliently deformable valve element can be moulded in situ on the spindle, or moulded separately and jumped on.

Fifth, due to the fact that the resiliently deformable valve element must enter the recessed valve seat, dust and any other foreign matter entering the valve stem or inflation connection is unlikely to get trapped between the valve and the valve seat, because of the shrouding effect of the recessed valve seat, and further, if any small particle of dust or foreign matter did get entrapped at one seating operation, it would almost certainly be dislodged at the next inflation operation.

In order that it may be clearly understood and readily carried into effect, the invention is hereinafter described with reference to the accompanying diagrammatic drawing, of which:

Figure 1 is a sectional elevation of an inflation valve according to the present invention; whereas Figure 2 is a similar view taken at right-angles to Figure 1 and showing the valve open.

In the drawing the reference numeral 1 indicates the body of the valve insides, which is externally threaded, as indicated at 2, for screwing into the conventional tyre valve stem 3, the inner end of which (not shown) is anchored to the inner tube. The upper end of the body 1 of the valve insides is provided with a pair of diametrically-opposed lugs for engagement by the slotted end of a conventional tyre valve cap. A static seal 5, preferably of initially rectangular section when unstressed and constituted by an annulus of resiliently-deformable rubber or synthetic rubber, is located in an external groove 6, and the body 1 is screwed into the valve tube 3 until the seal 5 makes sealing engagement with the tapered shoulder 7 normally provided.

The body 1 terminates inwardly in an annular formation 8, which internally embodies a cylindrical valve seat 9 extending inwardly to the step formation 10. The body 1 is bored right through, and a valve spindle 11 operates with radial clearance in the bore to permit fluid-flow through the bore. A head 12 is provided at a point near the inner end of the spindle 11, which in a closed condition of the valve may approach or even abut the step formation 10; but ducts 13 are provided at the step formation to ensure that if abutment results it will be non-sealing. Immediately behind the head 12 an annular groove 14 is provided in which a tapered valve 15 is fitted. The valve is formed of rubber or synthetic rubber and is resiliently deformable under the pressure conditions to which the valve is normally subject in use.

It may here be mentioned that the taper of the resiliently-deformable valve 15 need not necessarily be a continuous taper as seen in Figure 2. The taper is provided primarily to facilitate entry of the resiliently-deformable valve into the cylindrical valve seat 9. In assembly, the valve spindle 11 with the resiliently-deformable valve 15 seated in the groove 14 is entered through the bore of the body 1. The light compression spring 16 operates in the enlarged bore part 17 against the forked abutment 18 at the inner end of the spacer sleeve 19, which is itself located against axial movement outwardly along the plunger by the flattened end enlargement 20. Such enlargement is produced as a final operation by flattening the end portion of the plunger stem projecting out from the spacer sleeve 19.

An important feature of the invention is that the resiliently deformable valve 15 cooperates for sealing engagement with the cylindrical valve seat cup 9 and the spindle groove 14 by lateral sealing engagement induced by the prevailing pressure loading the head 12 of the plunger 11 against the ducted step 10. The valve 15, when unstressed, being of greater width or diameter than the internal width or diameter of the cup 9, and being resiliently deformable by the force with which it is pressed against the wall of its cup under the influence on its inner face of the prevailing air pressure conditions at which the valve is intended to operate, is squeezed by the valve seat cup as it enters, providing a highly efficient seal between the external periphery of the valve and the cylindrical valve seat.

Because the rubber or synthetic rubber normally used for the static seal 5 and the valve 15 though resiliently deformable is not compressible, appreciable clearance is provided endwise of the grooves 6 and 14 in order to permit axial extension of the seal and valve consequent on radial constriction. The endwise clearance so provided for the valve also leaves exposed its full available pressure face to be acted upon by the pressure internally of the valve stem 3, and the sealing action becomes more effective at higher pressures as the tapered valve is forced farther into the cylindrical cup 9, to be squeezed radially inward thereby more tightly.

In operation of the valve for inflation, an inflation device connection is screwed onto the outer end of the valve stem 3, which is threaded externally as indicated; and inflation pressure then operates over the entire area of the spindle 11, and also through the ducts 13 against the whole cross-sectional area of the head 12 and the resiliently-deformable valve 15 filling the cylindrical valve seat 9. As approximately only that same effective cross-sectional area is subject to internal pressure, the valve will open immediately the inflation pressure slightly exceeds that loading the valve shut. The force exerted by the compression spring 16 is in any event only a very light loading force. Obviously, therefore, the valve in accordance with the present invention operates for opening and closing under the influence of a very small pressure gradient such as will not materially interfere with the readings of a pressure gauge directly off the inflation or equivalent pressure-line.

A useful feature of the invention from the manufacturing point of view is that the external packing ring 5 and the resiliently-deformable valve 15 can be jumped-on each into its respective groove, or they can be moulded in situ.

What I claim is:

1. Valve insides, comprising an axially bored body formed for removable securement within a valve stem; a valve spindle extending through its bore and mounted for removal with said body; valve means including a valve member and a seat member, one on said body and the other on said spindle; one of said members being formed as a cup of appreciable depth relative to its breadth having generally cylindrical walls, and the other as a generally complementally shaped annular plug formed to seat throughout a material portion of its length upon the walls of said cup; one of said members being resilient and the other being substantially rigid; the valve spindle and said body being complementally shouldered to limit lengthwise movement in the valve-seating sense, at least one such shoulder having spacing means, whereby to expose substantially equivalent inner and outer end areas of the valve member to internal and to external pressures, respectively, at opposite ends of the valve seat member; and the plug and the cup being formed with complementally engageable lead-in surfaces, but otherwise the external diameter of the plug being slightly larger than the internal diameter of the cup, when the resilient member is unstressed, whereby relative lengthwise seating movement of said members deforms the resilient member radially and causes it to react, by its inherent resilience, firmly radially against the rigid member, to effect a tight seal between the cup and plug of the valve and seat members about their entire contacting peripheries.

2. Valve insides comprising an axially bored body formed for removable securement within a valve stem, the bore being enlarged at each end to define at its inner end an inwardly directed cup having a generally cylindrical imperforate wall constituting a valve seat, and a recess at the body's outer end affording an outwardly facing shoulder; a valve spindle of a length to project entirely through and loosely guided within the bore; means defining an inwardly facing shoulder on the outer end of the spindle, spaced from said outwardly facing shoulder of the bore; light spring means interposed between said shoulders, urging the spindle outwardly of the bore; and a generally cylindrical valve of resilient material carried by the inner end of said spindle, and of a size and shape, throughout at least the major portion of its length, such that, when unstressed, it is complemental to and slightly in excess, radially, of the interior of said cup, whereby, when said valve is forced into said cup by internal pressure, assisted by said spring means, the valve is squeezed into secure and generally uniform seating engagement about its entire entered periphery with the imperforate wall of the cup; the valve and the seat being complementally formed to initially lead the valve within the cup, and the several parts being so proportioned that the spindle may be projected inwardly sufficiently far to project the valve inwardly clear of the cup, for inflation or deflation; and spacer means intermediate the bottom of the cup and the outer end of the valve, to afford access of inflation pressure to the outer end of the valve, while the valve is seated, to assist in unseating the valve against internal pressure acting upon its inner end.

3. Valve insides comprising a axially bored body formed for removable securement within a valve stem, its bore terminating at its inner end in an inwardly directed cup defining generally cylindrical walls constituting a valve seat, but flared at its entrance, and defining also an inwardly facing annular shoulder, a valve spindle of a length to project entirely through and loosely guided within the bore, and shouldered at its inner end to seat upon said shoulder of the bore's cup, stop means formed as spacers intermediate and to limit approach of said two shoulders, for access of pressure to the entire area of the spindle's shoulder, resilient means biasing said spindle shoulder towards the cup's shoulder, and an elongated annular valve of resiliently compressible material received upon said spindle, inwardly of the latter's shoulder, of radial dimensions somewhat exceeding those of the inside valve seat area of the cup, whereby as it enters and seats with increasing peripheral area upon the walls of the cup, it is increasingly compressed therewithin.

FREDERICK EDWARD KILLNER.

REFERENCES CITED

The following references are of record in the file of this patent:

UNITED STATES PATENTS

| Number | Name | Date |
|---|---|---|
| 307,428 | Borden | Nov. 4, 1884 |
| 485,540 | Gibbs | Nov. 1, 1892 |
| 780,929 | Angehr | Jan. 24, 1905 |
| 950,186 | Mueller | Feb. 22, 1910 |
| 976,702 | Schuster | Nov. 22, 1910 |
| 1,187,154 | Kraft | June 13, 1916 |
| 1,200,358 | Irons | Oct. 3, 1916 |
| 1,223,179 | Kelly | Apr. 17, 1917 |
| 1,289,474 | Keister | Dec. 31, 1918 |
| 1,478,002 | Eastburn | Dec. 18, 1923 |
| 1,482,315 | Myers | Jan. 29, 1924 |
| 2,075,167 | Broecker | Mar. 30, 1937 |
| 2,148,850 | Deakins | Feb. 28, 1939 |
| 2,228,984 | Broecker | Jan. 14, 1941 |
| 2,299,073 | Beasley | Oct. 20, 1942 |
| 2,300,498 | Goff | Nov. 3, 1942 |

FOREIGN PATENTS

| Number | Country | Date |
|---|---|---|
| 40,549 | Germany | 1887 |